United States Patent
Austin (10) Patent No.: US 8,100,058 B2
(45) Date of Patent: *Jan. 24, 2012

(54) MONORAIL SORTATION SYSTEM

(75) Inventor: Robert Austin, Sarasota, FL (US)

(73) Assignee: Crossbelt IP, L.L.C., New Braunfels, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/502,643

(22) Filed: Jul. 14, 2009

(65) Prior Publication Data
US 2010/0089274 A1    Apr. 15, 2010

Related U.S. Application Data

(63) Continuation of application No. 10/531,322, filed as application No. PCT/US03/32703 on Oct. 16, 2003, now Pat. No. 7,559,282.

(60) Provisional application No. 60/418,795, filed on Oct. 16, 2002.

(51) Int. Cl.
    *B60S 13/02*    (2006.01)
    *B61B 13/04*    (2006.01)

(52) U.S. Cl. .................................... 104/48; 105/141

(58) Field of Classification Search ............ 104/48, 104/88.01, 89, 91, 93, 96, 118, 119, 121; 105/141, 144, 148, 150
See application file for complete search history.

(56) References Cited

U.S. PATENT DOCUMENTS

| | | | |
|---|---|---|---|
| 4,671,183 A | 6/1987 | Fujita et al. | |
| 4,763,771 A | 8/1988 | Geerts | |
| 4,930,613 A * | 6/1990 | Okura et al. | 198/370.06 |
| 5,205,220 A * | 4/1993 | Wallace | 105/167 |
| 5,293,308 A | 3/1994 | Boys et al. | |
| 5,433,311 A | 7/1995 | Bonnet | |
| 5,445,080 A | 8/1995 | Austin | |
| 5,632,589 A * | 5/1997 | Bray et al. | 414/339 |
| 5,676,061 A * | 10/1997 | Loomer | 105/141 |

(Continued)

FOREIGN PATENT DOCUMENTS
DE    39 10 542    8/1990
(Continued)

OTHER PUBLICATIONS

Supplementary European Search Report for PCT/US03/32703.

*Primary Examiner* — Joe Morano, IV
*Assistant Examiner* — R. J. McCarry, Jr.
(74) *Attorney, Agent, or Firm* — Hahn Loeser & Parks LLP (57) ABSTRACT

A universal cross belt sorter system (1) consisting of four major components: a monorail track (26), a drive car (20), multiple cross belt cars (24) and system controls. The drive cars (20) pull multiple cross belt cars (24) along the track (26). The cross belt cars (24) are typically loaded with material, which is then discharged into outlets. An outlet may be a chute, a bin, a conveyor, a truck, etc. Sortation systems are typically used to consolidate material according to selected parameters, such as zip code, customer order, to replenish a specific store and many other identifying information. The cross belt cars (24) are loaded with material at induction areas (3). The types or methods of inducting material onto the cross belt cars (24) range from manual to semi-automatic to fully automatic.

43 Claims, 9 Drawing Sheets

U.S. PATENT DOCUMENTS

| | | | |
|---|---|---|---|
| 5,901,830 A | 5/1999 | Kalm et al. | |
| 5,927,657 A | 7/1999 | Takasan et al. | |
| 6,193,074 B1 | 2/2001 | Baum et al. | |
| 6,231,293 B1 | 5/2001 | Ostholt et al. | |
| 6,253,910 B1 | 7/2001 | Axmann | |
| 6,273,268 B1 | 8/2001 | Axmann | |
| 6,360,673 B1 | 3/2002 | Herrin et al. | |
| 6,371,032 B1 * | 4/2002 | Graefer et al. | 105/141 |
| 6,459,061 B1 | 10/2002 | Kugle et al. | |
| 6,602,038 B2 | 8/2003 | Ahn et al. | |
| 6,655,297 B2 | 12/2003 | Kawato et al. | |
| 6,669,001 B1 | 12/2003 | Bromley et al. | |
| 7,559,282 B2 * | 7/2009 | Austin | 105/141 |

FOREIGN PATENT DOCUMENTS

| | | |
|---|---|---|
| EP | 1 153 860 | 11/2000 |
| GB | 595 599 | 12/1947 |
| WO | 95/18757 | 7/1995 |
| WO | 97/09258 | 3/1997 |

* cited by examiner

MONORAIL SORTATION SYSTEM

This application is a continuation of U.S. application Ser. No. 10/531,322, filed Apr. 12, 2005, now U.S. Pat. No. 7,559,282, which was the national stage entry of PCT/US03/32703, filed Oct. 16, 2003, which claimed priority from provisional application Ser. No. 60/418,795, filed Oct. 16, 2002, the disclosures of which applications are hereby incorporated by reference.

BACKGROUND OF THE INVENTION

This invention relates generally to sortation systems and more particularly to monorail sortation systems.

Automated material handling and sortation systems are known for receiving, transporting and discharging goods among various stations in large scale sortation operations, for example warehousing, distribution, postal sortation and handling of mail and packages, and airport baggage handling, to name a few. Whatever the operation, goods typically originate from one location within the facility and must be sorted and transported to several different locations for further handling, or originate from several locations within a facility and must be transported to a single location such as a shipping dock. The manner in which the goods are sorted and selectively distributed among various stations in a facility of course depends on the nature of the operation.

One known sortation and delivery method involves using powered belt or roller conveyers to transport individual items or sorted loads of items to various destinations within a facility. When goods from multiple sources must be delivered to a single station, associated take away conveyors must be merged onto a main conveyor or discharge point. This requires careful coordination of each item as it arrives to prevent jams or damage. Each merge point on such a conveyor system would accordingly require a complex system of sensors, start/stop controls, actuators, power supply lines, etc. Similarly, when items must be delivered to multiple destinations or stations in a facility, a main conveyor must be provided with diverter apparatus to direct individuals items or batches of items to either continue or be diverted at various points. Each diverter apparatus would require an additional closed system including sensors, actuators, control mechanisms, wiring and power supply to accomplish the diverting operation and track and identify the items being diverted.

The disadvantages of conveyor-type systems have led to the development of tracked systems. In one known type of system, a closed loop track carries cars propelled by a continuous belt or chain drive. The cars are equipped with open trays which can be loaded from chutes, and subsequently tilted to unload their carloads into bins which are located around the track. These cars are often termed "dumb" because they do not initiate any sorting actions, but rather respond to stimuli from the induction stations to discharge their load. For example, car speed is controlled by a track-side motor which circulates the belt or train drive, and car dumping is controlled by track-side dumping mechanisms. Such systems are designed for long term installations which sort and transport large volumes of goods. Although these closed loop track systems are an improvement over conveyor-type systems, the complexity of their track, drive and tilting mechanisms makes it a major undertaking to set them up or rearrange their sortation layout. They must be shut down for nearly all maintenance tasks.

The foregoing illustrates limitations known to exist in present sortation systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a sortation system comprising: a longitudinally extending monorail track; a plurality of interconnected cars, at least one car being a drive car, and at least one car being an article conveying car.

In a second aspect of the present invention, this is accomplished by providing a sortation system comprising: a longitudinally extending monolithic monorail track comprising: an upper wheel engaging section; a lower wheel engaging section; and a power section, the upper section being connected to an upper portion of the power section and the lower section being connected to a lower portion of the power section; a multi-conductor power bus mounted within the power section; two longitudinally extending mounting flanges, each mounting flange having a U-shape, one side of the mounting flange U-shape being coincident with a portion of one side of one of the upper wheel engaging section and the lower wheel engaging section; and one side of the mounting flange U-shape being coincident with a portion of one side of the power section, wherein the upper wheel engaging section and the lower wheel engaging section are spaced apart, the track having a closed side being closed by the power section and an open side opposite the power section, the open side being between the upper wheel engaging section and the lower wheel engaging section; a plurality of interconnected cars, at least one car being a drive car, and at least one car being an article conveying car, the at least one drive car and the at least one article conveying car each have a brush assembly slidably engaging the power bus.

In a third aspect of the present invention, this is accomplished by providing a sortation system comprising: a longitudinally extending monorail track; a plurality of interconnected cars, at least one car being a drive car, and at least one car being an article conveying car, each car including two wheel assemblies, each wheel assembly engaging the track, each wheel assembly comprising: two vertically spaced apart side wheels, the side wheels rotating about a vertical axis; and an end wheel, the end wheel rotating about a horizontal axis, the end wheel being a caster, the caster swiveling about a vertical axis.

In a fourth aspect of the present invention, this is accomplished by providing a track comprising: a longitudinally extending monolithic monorail track having an upper wheel engaging section; a lower wheel engaging section; and a power section, the upper wheel engaging section being connected to an upper portion of the power section and the lower wheel engaging section being connected to a lower portion of the power section; and a multi-conductor power bus mounted within the power section, wherein the upper wheel engaging section, the lower wheel engaging section and the power section each have a U-shape, wherein the upper wheel engaging section has its open side facing downward, the lower wheel engaging section has its open side facing upward, and the power section has its open side facing horizontally; and the upper wheel engaging section open side, the lower wheel engaging section open side and the power section open side all facing towards a common center.

In a fifth aspect of the present invention, this is accomplished by providing a drive car adapted for drivingly engaging a track comprising: a frame; a plurality of wheel assemblies attached to the frame; and a motor and drive wheel assembly attached to the frame, the motor and drive wheel assembly being vertically movable relative to the frame, the drive wheel being adapted to drivingly engage the track.

In a sixth aspect of the present invention, this is accomplished by providing a drive car adapted for drivingly engaging a track comprising: a frame; two wheel assemblies attached to the frame, each wheel assembly comprising: a plurality of spaced apart side wheels, the side wheels rotating about a vertical axis; and an end caster wheel, the end caster wheel rotating about a horizontal axis, the drive car having a forward direction of travel, one wheel assembly having the end wheel at an upper end of the wheel assembly and being forward of the other wheel assembly, the end wheel of the other wheel assembly being at a lower end of the wheel assembly; and a motor and drive wheel assembly attached to the frame, the motor and drive wheel assembly being vertically movable relative to the frame, the drive wheel being adapted to drivingly engage the track, the motor and drive wheel assembly comprising: a cantilever bar attached to a rear part of the motor and drive wheel assembly, a portion of the cantilever bar distal from the motor and drive assembly being attached to the frame; and a slide assembly mounted between the rear part of the motor and drive wheel assembly and the frame, the slide assembly comprising a slide slidably fitting within a slotted member, the slide assembly permitting the motor and drive wheel assembly to move vertically relative to the frame, the drive wheel being positioned between the wheel assemblies.

In a seventh aspect of the present invention, this is accomplished by providing an article conveying car adapted for movably engaging a track comprising: a frame; an endless movable belt; at least three rotatable rollers attached to the frame, the movable belt being positioned about the rollers; and at least one of the rollers being translatably moveable relative to the movable belt.

In an eighth aspect of the present invention, this is accomplished by providing an article conveying car comprising: a frame comprising two side plates connected by a plurality of cross bars; three rollers rotatably attached to the side plates, the three rollers being arranged in a triangle; an endless movable belt about the rollers; two wheel assemblies attached to the frame, each wheel assembly comprising: a plurality of spaced apart side wheels, the side wheels rotating about a vertical axis; and an end wheel caster at a lower end of the wheel assembly, a wheel of the end wheel caster rotating about a horizontal axis; a bi-direction position controllable belt drive attached to the frame and operably connected to one of the rollers; and an interconnection adapted to connect one article conveying car to one of a drive car and another article conveying car, the interconnection including a mechanical connection and an electrical connection.

In a ninth aspect of the present invention, this is accomplished by providing an article conveying car comprising: a frame comprising two side plates connected by a plurality of cross bars, and a reduced friction plate having a groove therein; three rollers rotatably attached to the side plates, the three rollers being arranged in a triangle, each roller having a groove therein; an endless movable belt about the rollers, the belt having a rib extending therefrom, the belt rib tracking in at least one of the reduced friction plate groove and the roller grooves; two wheel assemblies attached to the frame; and a bi-direction position controllable belt drive attached to the frame and operably connected to one of the rollers.

The foregoing and other aspects will become apparent from the following detailed description of the invention when considered in conjunction with the accompanying drawing figures.

DETAILED DESCRIPTION

Figure 1:
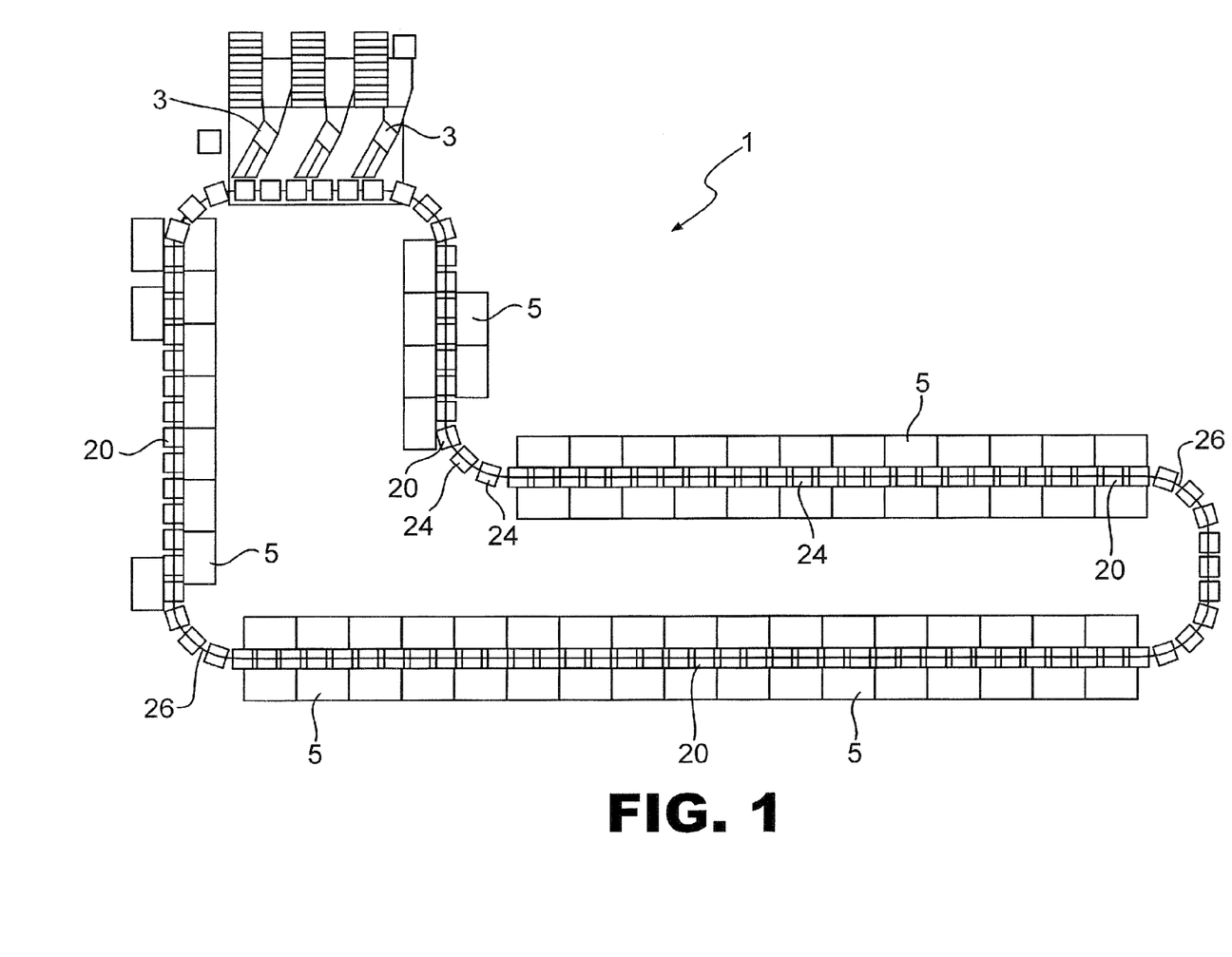
FIG. 1 is a plan view of a monorail sortation system according to the present invention.
Figure 2:
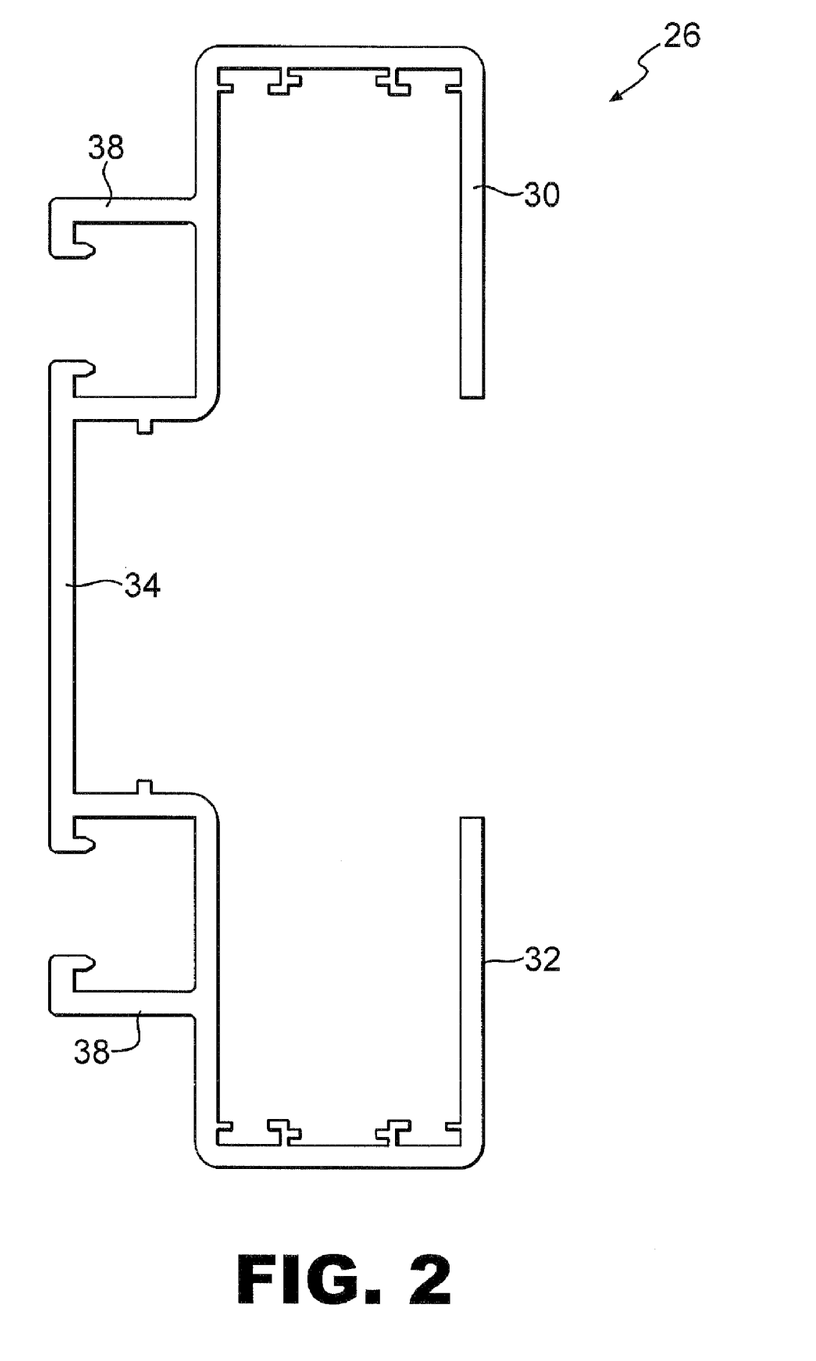
FIG. 2 is an end view of a monorail track for use with the sortation system shown in FIG. 1.
Figure 3:
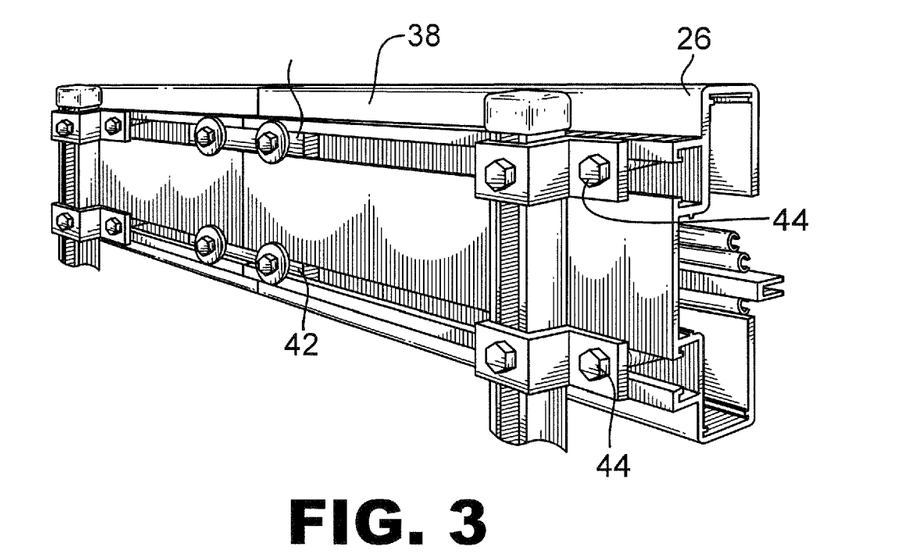
FIG. 3 is a perspective view of the monorail track shown in FIG. 2, illustrating the mounting flanges.
Figure 4:
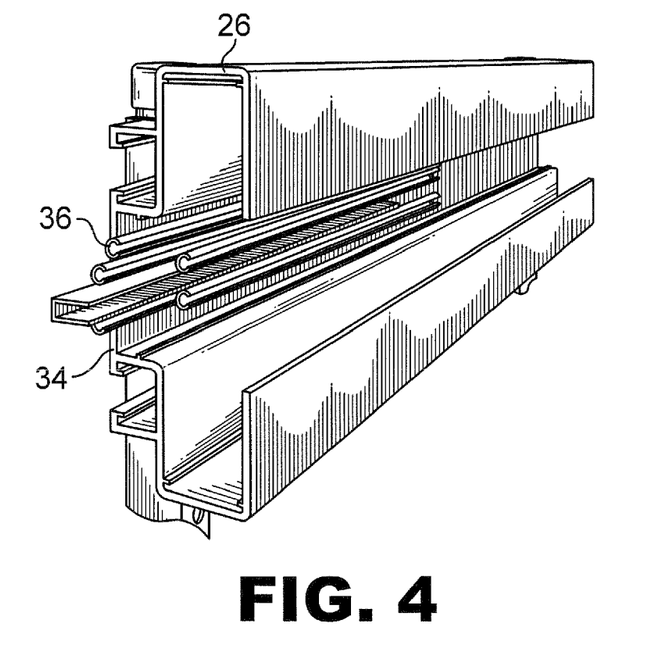
FIG. 4 is a second perspective view of the monorail track shown in FIG. 2, illustrating the power bus.
Figure 5:
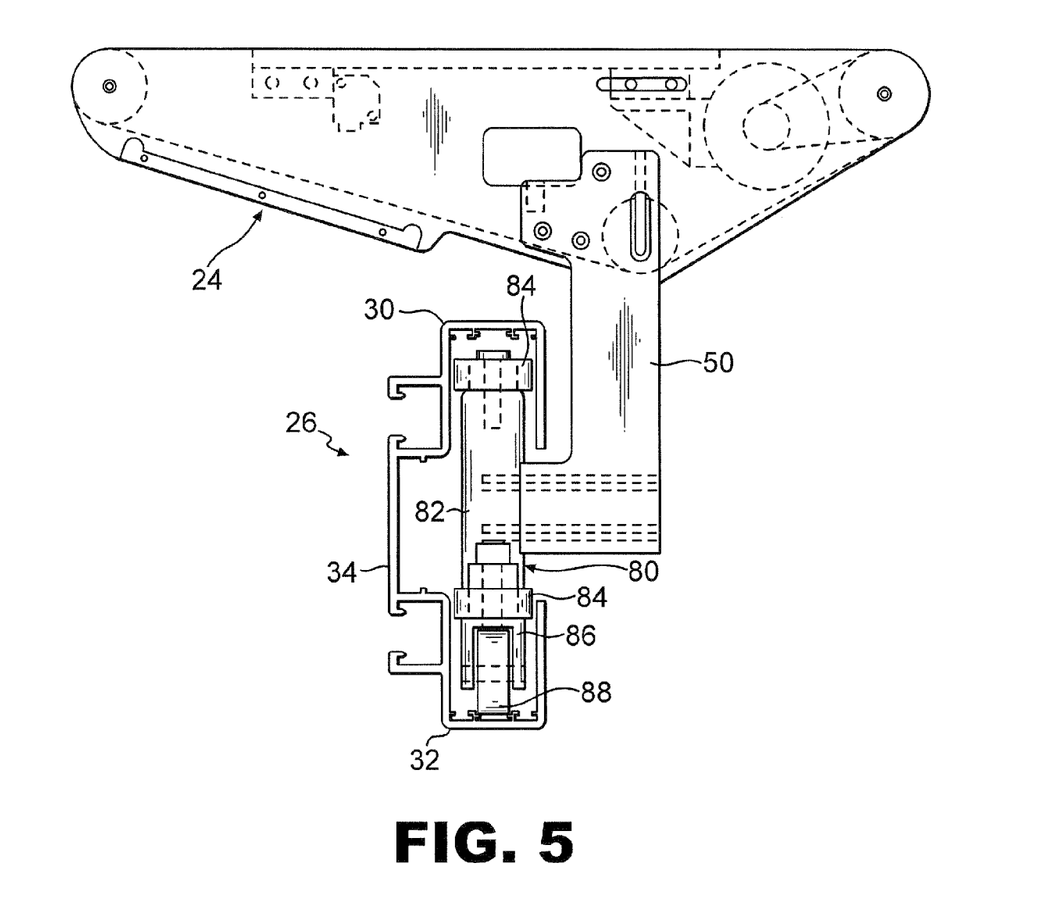
FIG. 5 is an end view of a section of the monorail track shown in FIG. 2, illustrating the engagement of a wheel assembly with the track.

FIG. 1 shows a sortation system 1 according to the present invention. In this sortation system 1, a continuous loop monorail track 26 supports a continuous train of interconnected tow or drive cars 20 and cross belt or article conveying cars 24. In one embodiment, a drive car 20 can pull about 24 article conveying cars. Although the drawings show a cross belt type car 24, other types of article conveying cars, such as a tilting car, can be used with the present invention. In addition to providing support for the cars 20, 24, the monorail track 26 also provides electrical power through a power bus 36 attached to the track 26 to the cars 20, 24. In the preferred embodiment, DC power at 80 volts for the drive motors and 24 volts for electronics is supplied through power bus 36. Preferably, a wireless communication system is used to provide control signals from a central control system to the cars 20, 24. Alternatively, a wired communication system could be included in the power bus 36.

Sortation system 1 includes multiple induction stations 3 where packages or articles are loaded onto article conveying cars 24. Multiple bins 5 accept the packages from the article conveying cars 24. When a package is loaded onto to an article conveying car 24, the control system is updated with information about the package, such as its destination, and associates that package with that particular article conveying car 24. As the article conveying car 24 approaches the appropriate bin 5 for that package, the control system signals the article conveying car 24 to unload the package into the appropriate bin 5. Alternatively, the control system informs the article conveying car 24 of the location of the appropriate bin. The article conveying car 24 keeps track of its location relative to the appropriate bin 5 and unloads the package into the appropriate bin.

Although there are many ways for the sortation system 1 to track the article conveying cars 24 relative to the appropriate bin 5, one method used for the present sortation system uses photo sensors (not shown) on the article conveying cars 24. When a package is loaded onto an article conveying car 24, the control system tells the car 24 to unload the package XX flags from the loading station 3. Placed about the system 1 are flags that are sensed by the photo sensors. For example, a package going to Minneapolis is loaded onto car 24. The bin 5 for Minneapolis packages is positioned 27 flags from the loading station 3. The article conveying car photo sensor senses the car 24 passing the flags. As the car 24 approaches the 27th flag, a controller on the article conveying car 24 operates an unloading mechanism or belt 100 to unload the package into the Minneapolis bin. ID tags, preferably bar codes, 54 are provided on each car 20, 24. A bar code sensor is used by the control system to determine which car 24 is being loaded with what package so that the appropriate destination commands can be sent to the right article conveying car 24.

FIGS. 2 through 5 show the features of monorail track 26 and the engagement of cars 20, 24 with track 26. Preferably track 26 is formed from multiple sections of either straight or curved monolithic extruded track. Track 26 is preferably an aluminum alloy. Track 26 includes an upper section 30 attached to a power section 34 that has a lower section 32 attached to it. Above and below the power section 34 are two longitudinally extending mounting flanges 38. A power bus 36, such as power conductors supplied by Vahle Electrification Inc. is mounted in power section 34. Each car 20, 24 includes a removable brush assembly 52 that slidably engages the power bus 36 so that power can be transferred to the cars 20, 24.

Mounting flanges 38 have two purposes. First, the flanges 38 are used to attach the track 26 to building structures, such as floors, walls or ceilings. Mounting brackets 44 are used to secure track 26 to whatever additional framework is needed to attach the track 26 to the appropriate structure. The second purpose of mounting flanges 38 is to secure one section of track 26 to an adjacent section of track 26 (See FIG. 3). Where two sections of track 26 are joined, jointers 42 are placed in the mounting flanges 38 of the two sections of track 26. The jointers 42 extend between the two sections of track 26 and are secured with fasteners or other mounting hardware.

Figure 9:
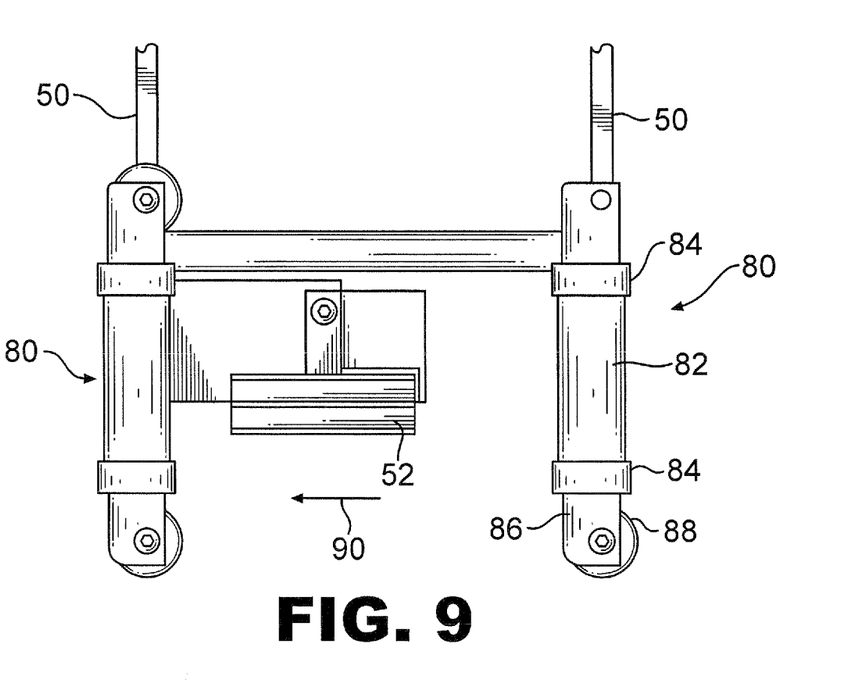
FIG. 9 is a side view of the lower portion of the tow car shown in FIG. 6.
Figure 10:
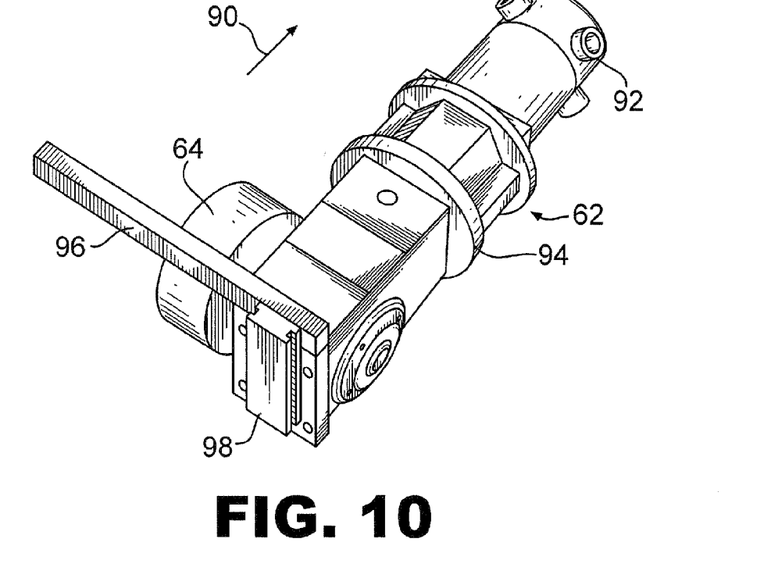
FIG. 10 is a perspective view showing the details of the motor and drive wheel assembly.
Figure 11:
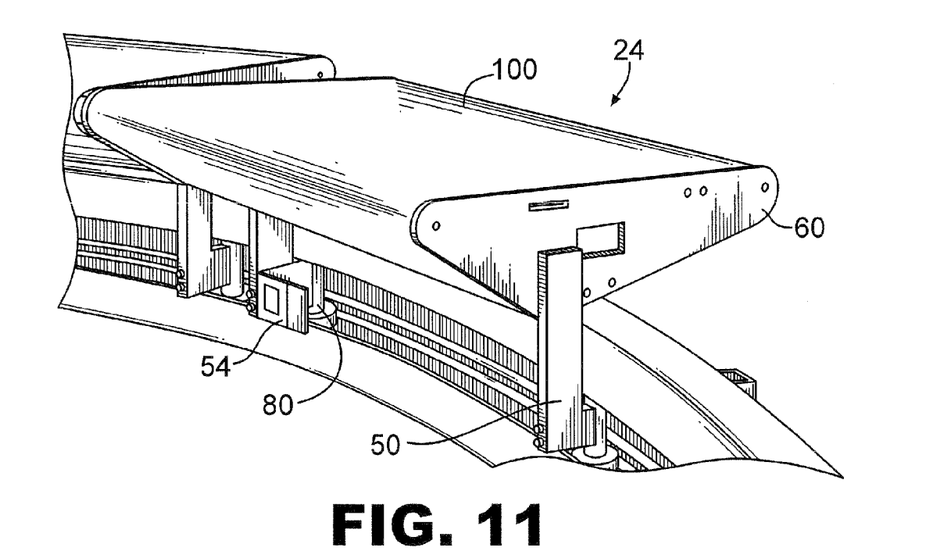
FIG. 11 is a perspective view of the cross belt car shown in FIG. 1.
Figure 12:
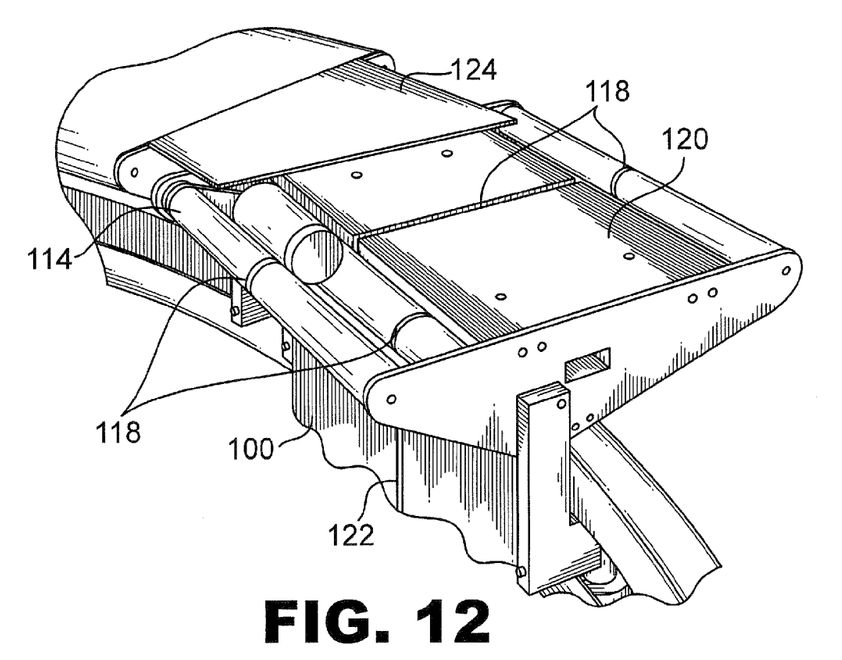
FIG. 12 is a perspective view of the cross belt car shown in FIG. 11, with the cross belt removed.
Figure 13:
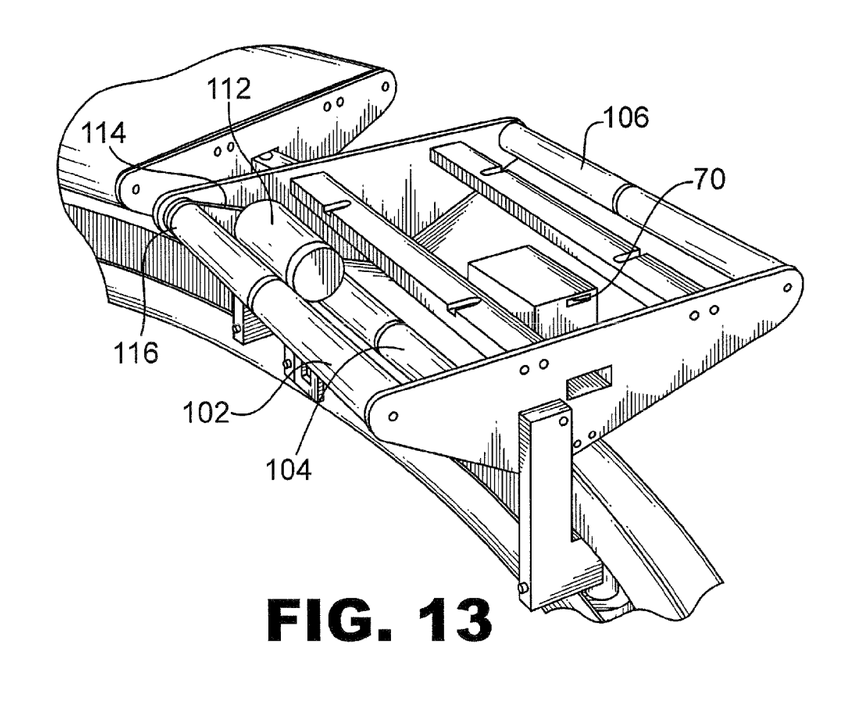
FIG. 13 is second perspective view of the cross belt car shown in FIG. 11, with certain components removed.
Figure 14:
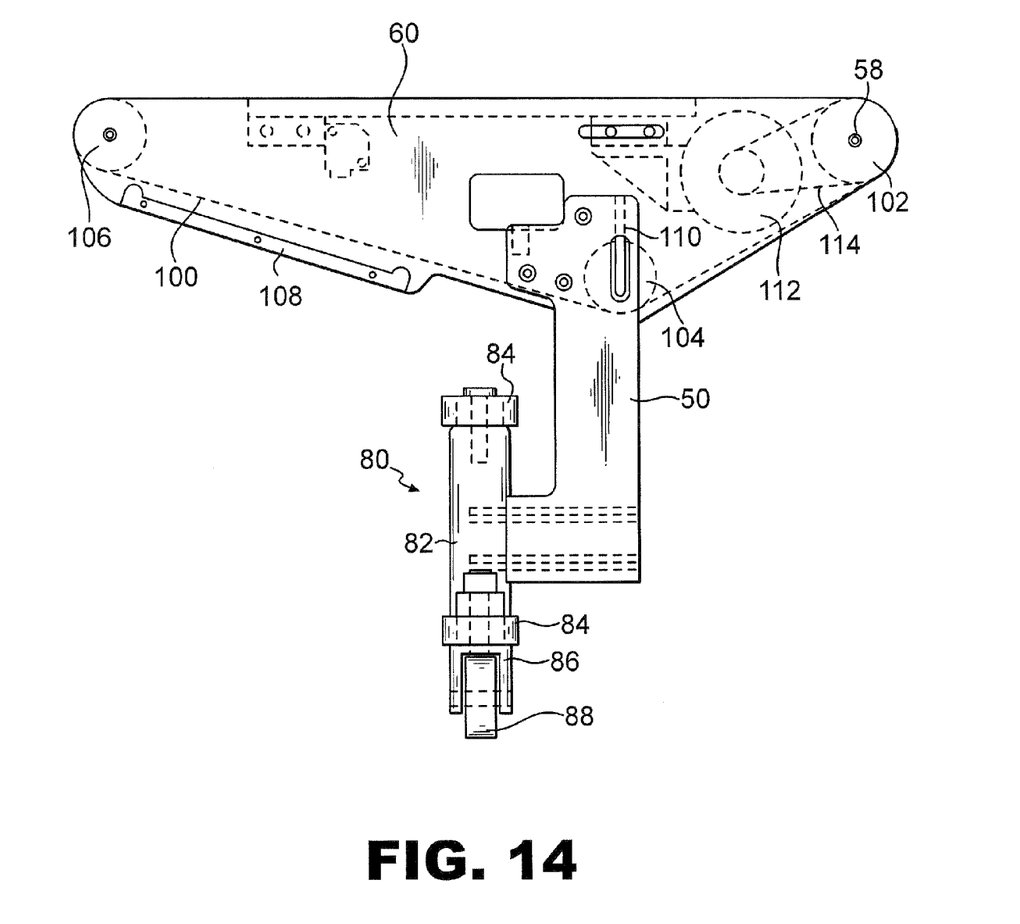
FIG. 14 is an end view of the cross belt car shown in FIG. 11.

Both types of cars 20, 24 use similar wheel assemblies 80 to attach the cars 20, 24 to the track 26. Each wheel assembly 80 consists of a center member 82 that is removably attached to a wheel assembly support 50. Wheel assembly support 50 is then attached to car 20, 24. Rotatable side wheels 84 are attached to the ends of center member 82. Side wheels 84 roll against the sides of track upper and lower sections 30, 32. End wheel(s) 88 are attached to either end, or both ends, of center member 82. Preferably, end wheel 88 uses a caster mount 86 that allows end wheel 88 to swivel as car 20, 24 moves through a section of curved track. Preferably, each car 20, 24 uses two wheel assemblies 80. In one embodiment, both end wheels 88 on an article conveying car 24 are at the lower end of the wheel assemblies 80. In another embodiment of a drive car 20 (see FIG. 9), one end wheel 88 is at the lower end of one wheel assembly 80 and one end wheel 88 is at the upper end of the other wheel assembly 80. The forward wheel assembly (relative to the direction of travel as shown by arrow 90) has the end wheel 88 at the upper end of wheel assembly 80. The forward wheel assembly 80 can optionally have a second end wheel 88 at its lower end, as shown in FIG. 9.

FIGS. 6 through 10 shows the details of drive car 20. Drive car 20 includes a frame formed from two side plates 60 and two cross bars 58. The article conveying car 24 uses a similar frame. A motor and drive wheel assembly 62 is attached to the rear of drive car 20. The motor and drive wheel assembly consists of a DC servo or positionable controllable motor 92 connected to a friction drive wheel 64 through a reducer and right angle drive 94. Drive wheel 64 engages the upper surface of track 26. Motor and drive wheel assembly 62 is suspended from the rear of car 20 by a cantilever arm 96 and a slide assembly 98. Cantilever arm 96 is attached to the reducer and right angle drive 94. The free end of cantilever arm 96 is attached to the frame of car 20. Slide assembly 98 consists of a slide on the reducer and right angle drive 94 that fits within, and slides within, a corresponding slotted block attached to the frame of car 20. This attachment arrangement for the motor and drive wheel assembly 62 suspends all the weight of the motor and drive wheel assembly 62 from the rear of car 20, allows the motor and drive wheel assembly 62 to move vertically, and thereby increases the downward force on drive wheel 64. Having all the weight at the rear of car 20 causes car 20 to tip up slightly in the front, see FIG. 8. Therefore, the forward wheel assembly 80 has the end wheel 88 at the upper end of the wheel assembly so that the end wheel 88 can ride against the inside top surface of the upper section of track 26.

Figure 6:
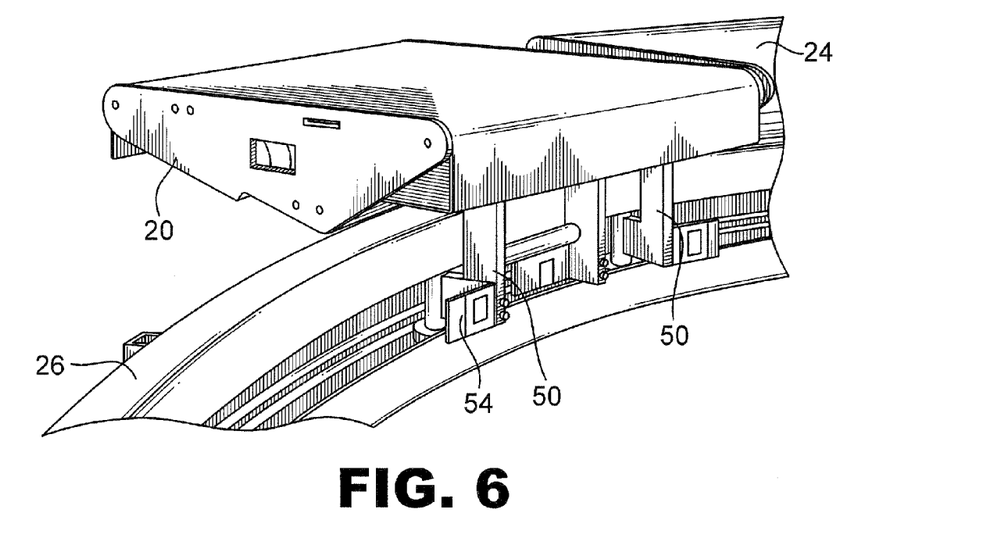
FIG. 6 is a perspective view of the tow car shown in FIG. 1.
Figure 7:
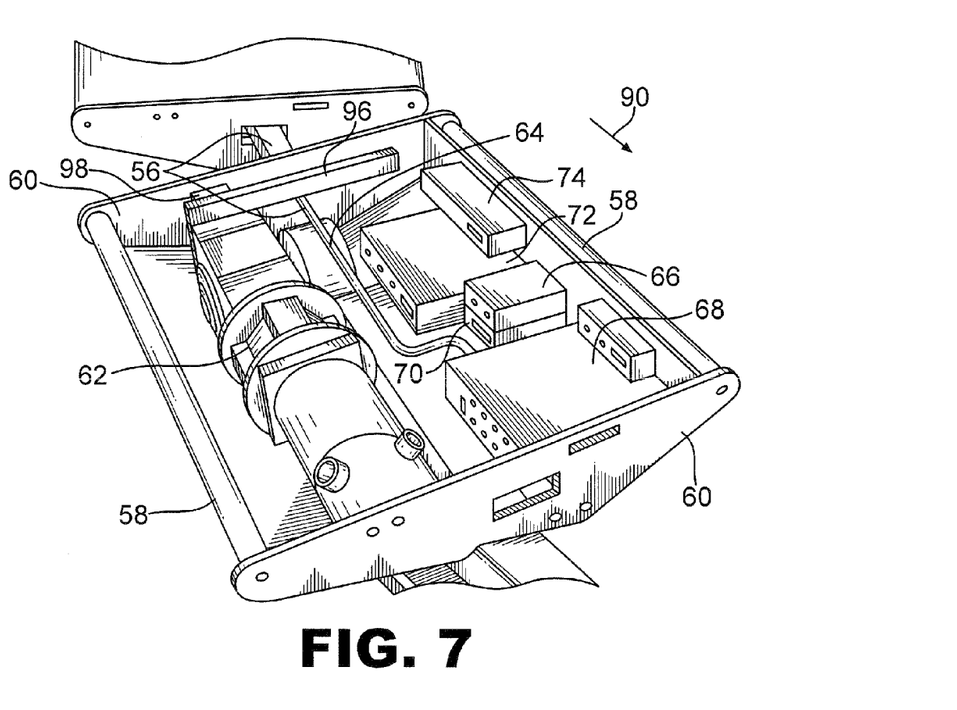
FIG. 7 is a perspective view of the tow car shown in FIG. 6, without a cover.
Figure 8:
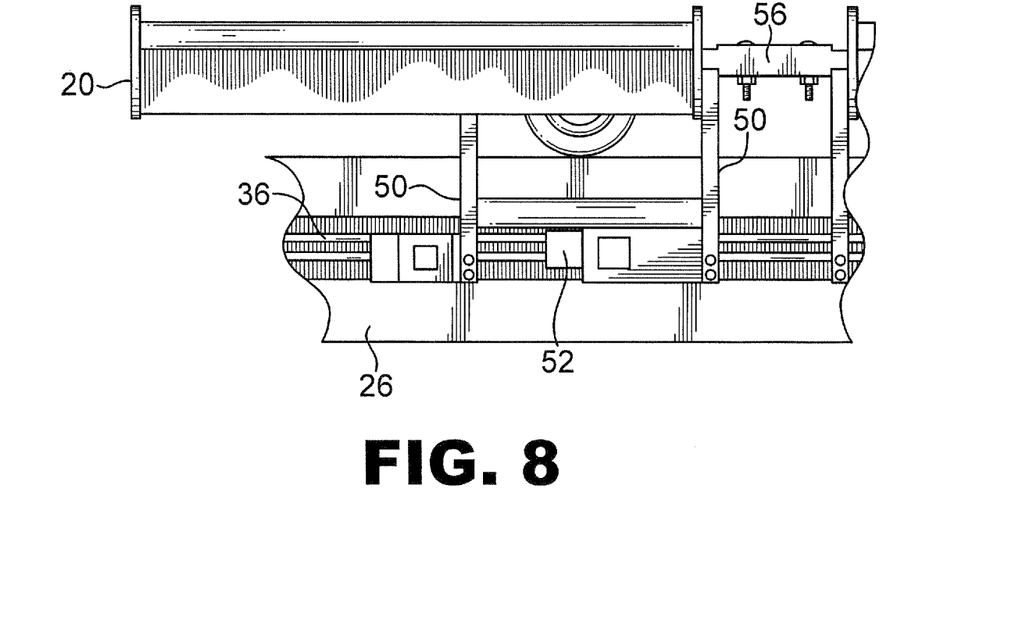
FIG. 8 is a side view of the tow car shown in FIG. 6.

Drive car 20 includes a wireless control signal receiver or modem 66 for receiving control signals from the central control system. The modem 66 can also be used for sending status information and error messages regarding the sortation systems cars back to the central control system. Modem 66 is connected to a computer 68 that in turn is connected to a DC servo controller 70. Depending upon the modem 66 and the DC servo controller 70 being used, modem 66 could be directly connected to the DC servo controller 70 thereby eliminating the computer 68. Car 20 includes a DC/AC inverter 72 that takes power from the power bus 36 via brush assembly 52 to supply AC power to any electronic components requiring AC power. A power supply 74 is provided to provide appropriate power to computer 68.

In operation, the central control system uses RF signals to broadcast control signals to drive cars 20 and to article conveying cars 24. Wireless modem 66 receives the control signals for both drive cars 20 and article conveying cars 24 and passes them to the computer 68, which then passes the control signals to the DC servo controller 70. DC servo controller 70 has two functions. First, it uses the control signals to send the appropriate control signals to DC servo motor 92 to move car 20. Second, it passes the control signals for the article conveying cars 24 through interconnection 56 to the other cars. Drive car 20 and article conveying car 24 use a CAN (Controller Area Network) serial bus network for inter-car communication. Interconnection 56 includes both a physical connection (see FIG. 8) and an electrical connection (see FIG. 7). Depending upon the characteristics of the controller 70 and the computer 68, the location where these functions are performed could change.

For a continuous sortation system, as shown in FIG. 1, the control of the multiple drive cars 20 has to be coordinated to evenly drive the continuous system. In one embodiment, the central control system sends commands to a lead drive car and the lead drive car coordinates the operation of the other drive cars. Alternatively, the central control system can coordinate the operation of all the drive cars and send individual commands to each drive car.

FIGS. 11 through 14 show the details of the article conveying car 24. Car 24 includes a frame formed from side plates 60 connected by two cross bars 58, similar to the frame for a drive car 20. Rotatable rollers 102, 106 are mounted on the cross bars 58. One roller 102 is a drive roller. The other roller 106 is preferably non-driven. A third roller 104 is positioned below rollers 102, 106 such that the three rollers form a triangle. Roller 104 is vertically movable and can be adjusted by threaded adjuster 110. A belt 100 is placed about the three rollers 102, 104, 106. Roller 104 is then adjusted to achieve the desired tension on belt 100. Belt 100 is preferably formed from a UHMW (Ultra High Molecular Weight) polymer, preferably a reduced friction polymer. A reduced friction UHMW polymer plate 120 is placed below the upper horizontal extent of belt 100. Plate 120 provides support for belt 100 when a package has been placed on car 24. Belt 100 includes a rib 122 extending below the belt. Rib 122 is essentially co-extensive with the length of belt 100. Corresponding grooves 118 are formed in the three rollers, 102, 104, 106 and plate 120. Tracking of the belt 100 is maintained by rib 122 tracking in grooves 118. This eliminates the need for side plates 60 to extend above belt 100 to maintain proper tracking of belt 100. It also eliminates the need for any roller adjustment mechanisms to adjust the tracking of belt 100. Without raised sides extending above belt 100, a large or long package can span two article conveying cars 24.

Car 24 includes a bi-directional DC servo motor 112 that is connected to drive roller 102 by drive belt 114. Preferably, both DC servo motor 112 and drive roller 102 include drive sprockets 116 and drive belt 114 is a grooved or ribbed timing belt. In one embodiment, roller drive sprocket 116 is cut into the end of roller 102. Car 24 includes a DC servo controller similar to the DC servo controller 70 for drive car 20. The DC servo controller receives commands from the central control system through interconnection 56 via a drive car 20 and any article conveying cars 24 between the DC servo controller and the drive car 20. In one embodiment, car 24 includes a photo sensor (not shown) that counts flags (not shown) to determine the position of car 24. When the designated number of flags have been counted, the DC servo controller operates DC servo motor 112 to move belt 100 causing a package to be moved from car 24 into a bin 5. When a large or long package has been placed on two adjacent article conveying cars 24, the DC servo controller for the lead or forward car operates its belt 100 first causing the package to turn towards bin 5. Next, belt 100 on the following car is operated ejecting the turned package into bin 5. Where bin 5 is large enough to accept a long package without it being turned first, belts 100 on both cars 24 are operated together to eject the long package into bin 5.

An intercar plate 124 is attached to the leading edge of car 24. Plate 124 extends across the gap between adjacent cars 24 and under the belt 100 on the leading car 24 (See FIG. 12). Plate 124 generally has a rectangular shape. In the preferred embodiment, plate 124 is formed of Lexan® polycarbonate resin.

In an alternate embodiment of sortation system 1, the drive cars 20 and article conveying cars 24 are combined into combination drive and article conveying cars. Preferably, this is accomplished by using a linear induction motor.

Linear electric motors belong to a special group of electrical machines that convert electrical energy directly to mechanical energy in translational motion. While all electric motors operate based on principles of electromagnetic interactions, there are different types of motors. Polyphase synchronous motors and induction motors both use alternating current as input electricity source. Direct current motors are normally used for small horsepower applications. Conceptually, any rotary motor has a linear counterpart. There are linear synchronous motors (with permanent magnet or wound field), linear induction motors, and linear direct current motors.

A linear electric motor is perhaps best understood by imagining the stator of an ordinary electrical motor being cut, unrolled and stretched lengthwise. An appropriate conductive material like copper, aluminum, or other material is positioned next to the unrolled stator. The alternating current in the unrolled stator provided by conventional techniques magnetically interacts with the conductive material to create a moving field of magnetic force acting on both the stator and the conductive material. The vehicle may be slowed down or stopped by reversing the polarity of that moving field.

A linear induction motor (LIM) consists of a primary and a secondary. When powered by three-phase alternating current, a moving flux is produced in the primary winding. Current induced in the secondary reacts with the flux, producing a mechanical force. Both the primary and the secondary of LIMs are flat structures. The interaction of flux and current moves the secondary linearly. A linear synchronous motor (LSM) has a similar structure, except that its secondary must be either a permanent magnet or a wound field with a direct current. The word "synchronous" comes from the fact that the primary magnetic field and the secondary magnetic field in a LSM move at the same speed.

A mount 108 is provided in side plates 60 to mount a reaction plate (aluminum and mild steel plates sandwiched together) bolts to each car 24. Linear motors bolt to the track parallel to the reaction plate with a small air gap. An AC drive powers the linear motor coils to propel the article conveying cars 24.

Having described the invention, what is claimed is:

1. A sortation system comprising:
   a longitudinally extending monorail track, the monorail track comprising:
      an upper wheel engaging section,
      a lower wheel engaging section; and
      a power section, the upper wheel engaging section being connected to an upper portion of the power section, the lower wheel engaging section being connected to a lower portion of the power section, and
      at least one longitudinally extending mounting flange extending outward laterally from the upper wheel engaging section, the lower wheel engaging section, or a combination thereof for attaching to a support structure; and
   a plurality of interconnected cars, at least one car being a drive car, and at least one car being an article conveying car.

2. The sortation system according to claim 1, wherein each car includes a plurality of wheel assemblies, each wheel assembly engaging the track, each wheel assembly comprising:
   a plurality of spaced apart side wheels, the side wheels rotating about a vertical axis, one side wheel engaging the upper wheel engaging section, the other wheel engaging the lower wheel engaging section; and
   at least one end wheel, the at least one end wheel rotating about a horizontal axis, the at least one end wheel engaging one of the upper wheel engaging section and the lower wheel engaging section.

3. The sortation system according to claim 2, wherein the car has a forward direction of travel, the forwardmost wheel assembly having the at least one end wheel at an upper end of the wheel assembly.

4. The sortation system according to claim 1, wherein the mounting flange has a U-shape, one side of the mounting flange being coincident with a portion of one side of one of the upper wheel engaging section and the lower wheel engaging section; and one side of the mounting flange being coincident with a portion of one side of the power section.

5. The sortation system according to claim 1, wherein there are two longitudinally extending mounting flanges.

6. The sortation system according to claim 1, wherein the monorail track is monolithic.

7. The sortation system of claim 1, further comprising
a reaction plate affixed to at least one of the drive car and article conveying car; and the sortation system further comprises
a plurality of linear motors affixed along the track.

8. A sortation system comprising:
a longitudinally extending monorail track, the monorail track comprising: a U-shaped upper wheel engaging section having its open side facing downward, a U-shaped lower wheel engaging section having its open side facing upward; and a power section, the upper wheel engaging section being connected to an upper portion of the power section, the lower wheel engaging section being connected to a lower portion of the power section;
a plurality of interconnected cars, at least one car being a drive car, and at least one car being an article conveying car, each car includes a plurality of wheel assemblies, each wheel assembly engaging the track at least partially inside the U-shaped upper and lower wheel engaging sections, each wheel assembly comprising:
a plurality of spaced apart side wheels, the side wheels rotating about a vertical axis, one side wheel engaging the upper wheel engaging section, the other wheel engaging the lower wheel engaging section; and
at least one end wheel, the at least one end wheel rotating about a horizontal axis, the at least one end wheel engaging one of the upper wheel engaging section and the lower wheel engaging section, the at least one end wheel is at a lower end of the wheel assembly.

9. The sortation system of claim 8, further comprising
a reaction plate affixed to at least one of the drive car and article conveying car; and
a plurality of linear motors affixed along the track.

10. A sortation system comprising:
a longitudinally extending monorail track;
a plurality of interconnected cars, at least one car being a drive car, and at least one car being an article conveying car, each car including two wheel assemblies each having an upper end and a lower end, each wheel assembly engaging the track, at least one wheel assembly comprising:
two vertically spaced apart side wheels, the side wheels rotating about a vertical axis; and
an end wheel, the end wheel rotating about a horizontal axis, the end wheel being a caster, the caster swiveling about a vertical axis at the lower end of the wheel assembly.

11. The sortation system according to claim 10, wherein the end wheel of one wheel assembly is at the upper end of the wheel assembly and the end wheel of the other wheel assembly is at the lower end of the wheel assembly.

12. The sortation system according to claim 10, wherein the end wheel of each wheel assembly is at the lower end of the wheel assembly.

13. A drive car adapted for drivingly engaging a track comprising:
a frame;
a plurality of wheel assemblies attached to the frame, wherein each wheel assembly comprises
a plurality of spaced apart side wheels, the side wheels rotating about a vertical axis; and
an end wheel, the end wheel rotating about a horizontal axis; and
a motor and drive wheel assembly attached to the frame, the motor and drive wheel assembly being vertically movable relative to the frame, a drive wheel of the motor and drive wheel assembly being adapted to drivingly engage the track.

14. The drive car according to claim 13, wherein there are two wheel assemblies and the drive wheel is positioned between the wheel assemblies.

15. The drive car according to claim 13, wherein the end wheel comprises a caster swiveling about a vertical axis.

16. The drive car according to claim 13, wherein a rear end of the motor and drive wheel assembly is attached to the frame.

17. The drive car according to claim 13, wherein the motor and drive wheel assembly includes a right angle gear reducer between a motor of the motor and drive wheel assembly and the drive wheel.

18. The drive car according to claim 13, wherein a motor of the motor and drive wheel assembly is a position controllable drive motor.

19. The drive car according to claim 13, further comprising:
a control signal receiver; and
a control signal transmission device adapted to transmit control signals to another drive car and to an article conveying car.

20. An article conveying car adapted for movably engaging a track comprising:
a frame:
an endless movable belt;
at least three rotatable rollers attached to the frame, one of the rollers being a drive roller, the movable belt being positioned about the rollers forming a space therebetween,
a motor operably connected to the drive roller positioned in the space between the rollers; and
at least one of the rollers being translatably moveable relative to the movable belt,
wherein there are only three rotatable rollers, only one of the three rollers being translatably movable.

21. The article conveying car according to claim 20, further comprising an adjuster attached to each end of the translatably movable roller.

22. The article conveying car according to claim 21, wherein the adjuster includes a threaded apparatus attached to the translatably movable roller.

23. The article conveying car according to claim 20, wherein the at least three rollers are arranged in a triangle.

24. The article conveying car according to claim 20, further comprising a low friction plate attached to the frame and positioned below a portion of the belt.

25. The article conveying car according to claim 20, further comprising:
a plurality of wheel assemblies attached to the frame, each wheel assembly adapted to engage the track, each wheel assembly comprising:
a plurality of spaced apart side wheels, the side wheels rotating about a vertical axis; and
at least one end wheel, the at least one end wheel rotating about a horizontal axis.

26. The article conveying car according to claim 25, wherein the at least end one wheel comprises a caster swiveling about a vertical axis.

27. The article conveying car according to claim 25, wherein the at least one end wheel is positioned at a lower end of the wheel assembly.

28. The article conveying car according to claim 20, where the motor is a bi-directional position controllable drive.

29. The sortation system of claim 20, further comprising:
a reaction plate affixed to the article conveying car; and
a plurality of linear motors affixed along the track.

30. An article conveying car adapted for movably engaging a track comprising:
a frame:
an endless movable belt;
at least three rotatable rollers attached to the frame, one of the rollers being a drive roller, the movable belt being positioned about the rollers forming a space therebetween,
a motor operably connected to the drive roller positioned in the space between the rollers,
at least one of the rollers being translatably moveable relative to the movable belt; and
a belt alignment system comprising a first alignment member on the belt and a second alignment member on at least one of the frame and at least one roller, the first alignment member engaging the second alignment member.

31. The article conveying car according to claim 30, wherein the first alignment member comprises a rib on the underside of the belt and the second alignment member comprises a groove.

32. The article conveying car according to claim 31, wherein the second alignment member comprises a groove in the at least three rollers.

33. The article conveying car according to claim 31, wherein the frame includes a reduced friction plate below a portion of the belt and the second alignment member comprises a groove in the plate.

34. The sortation system of claim 30, further comprising:
a reaction plate affixed to the article conveying car; and
a plurality of linear motors affixed along the track.

35. The sortation system of claim 30, further comprising an adjuster attached to each end of the translatably moveable roller.

36. The sortation system of claim 30, further comprising a low friction plate attached to the frame and positioned below a portion of the belt.

37. The article conveying car according to claim 30, further comprising:
a plurality of wheel assemblies attached to the frame, each wheel assembly adapted to engage the track, each wheel assembly comprising:
a plurality of spaced apart side wheels, the side wheels rotating about a vertical axis; and
at least one end wheel, the at least one end wheel rotating about a horizontal axis.

38. The article conveying car according to claim 30, where the motor is a bi-directional position controllable drive.

39. An article conveying car comprising:
a frame comprising two side plates connected by a plurality of cross bars;
three rollers rotatably attached to the frame, the three rollers being arranged in a triangle;
an endless movable belt about the rollers;
two wheel assemblies attached to the side plates, each wheel assembly comprising: a plurality of spaced apart side wheels, the side wheels rotating about a vertical axis; and an end wheel caster at a lower end of the wheel assembly, a wheel of the end wheel caster rotating about a horizontal axis;
a bi-direction position controllable belt drive attached to the frame and operably connected to one of the rollers; and
an interconnection adapted to connect one article conveying car to one of a drive car and another article conveying car, the interconnection including a mechanical connection and an electrical connection.

40. The article conveying car according to claim 39, further comprising a car drive attached to the frame and adapted to drivingly engage a track.

41. The article conveying car according to claim 40, wherein the car drive is a linear induction drive.

42. The sortation system of claim 41, further comprising:
a reaction plate affixed to the article conveying car; and
a plurality of linear motors affixed along the track.

43. An article conveying car comprising:
a frame comprising two side plates connected by a plurality of cross bars, and a reduced friction plate having a groove therein;
three rollers rotatably attached to the side plates, the three rollers being arranged in a triangle, each roller having a groove therein;
an endless movable belt about the rollers, the belt having a rib extending therefrom, the belt rib tracking in at least one of the reduced friction plate groove and the roller grooves;
two wheel assemblies attached to the frame; and
a bi-direction position controllable belt drive attached to the frame and operably connected to one of the rollers.

* * * * *